July 7, 1959 V. E. RIMSHA ET AL 2,893,425
NON-THERMOSTATIC ADJUSTABLE MIXING VALVE
Filed Jan. 9, 1957
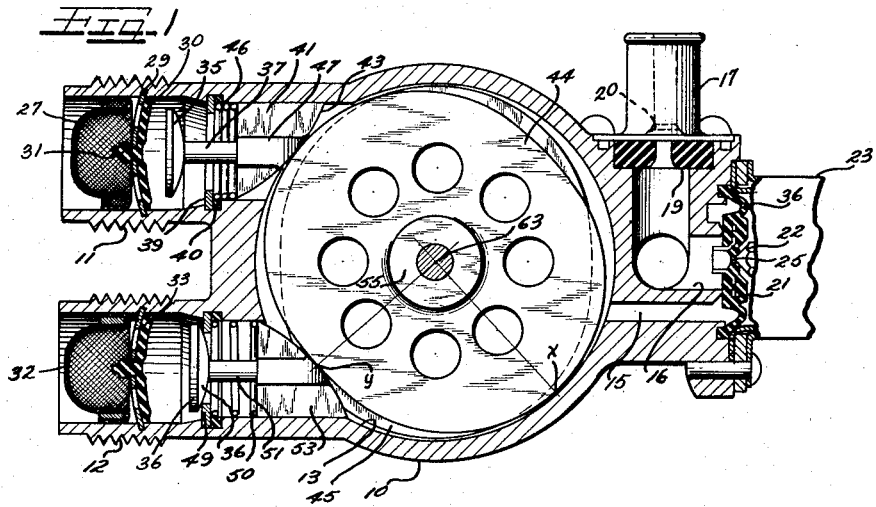
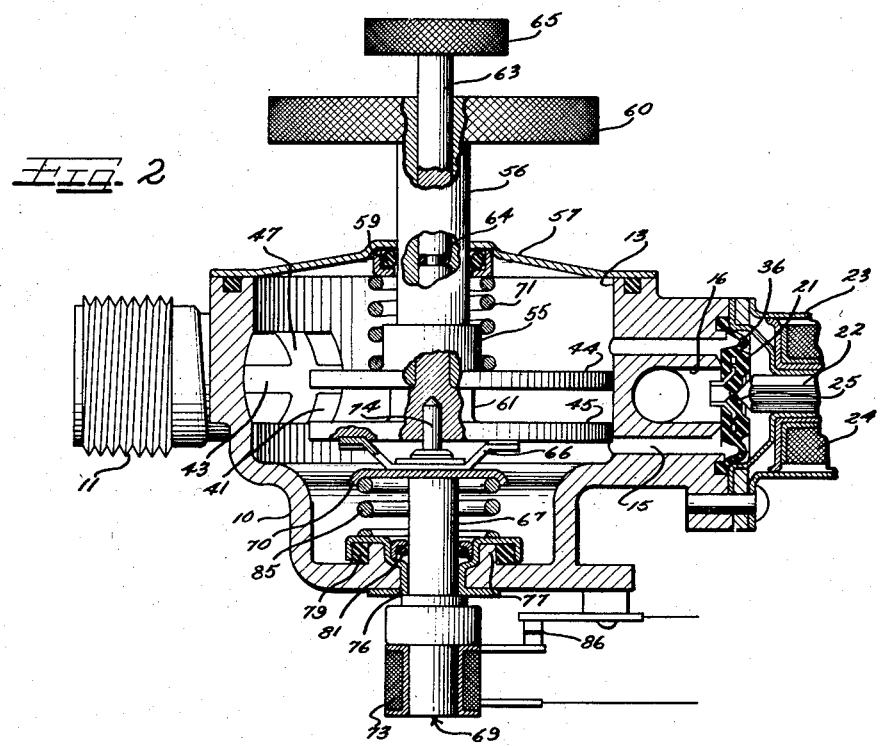
Inventors
VICTOR E. RIMSHA
ROBERT W. COUFFER JR.

United States Patent Office 2,893,425
Patented July 7, 1959

2,893,425

NON-THERMOSTATIC ADJUSTABLE MIXING VALVE

Victor E. Rimsha, Van Nuys, Calif., and Robert W. Couffer, Jr., Oak Park, Ill., assignors to The Dole Valve Company, Chicago, Ill., a corporation of Illinois Application January 9, 1957, Serial No. 633,363

10 Claims. (Cl. 137—607)

This invention relates to improvements in fluid mixing valves and more particularly relates to non-thermostatic mixing valves in which the delivery temperature of the water may be selected.

A principal object of the invention is to provide an improved form of temperature adjustable valve for mixing hot and cold water and adjustable to deliver water at the temperature of the hot or cold water entering the valve and at various selected intermediate temperatures.

Another object of the invention is to provide a cyclically controlled mixing valve particularly adapted for washing machines and the like and operable under the cyclic control of the washing machine for supplying water at various temperatures, independently preselected for the separate washing and rinsing operations, from the temperature of the cold water entering the valve to that of the hot water entering the valve.

A further object of the invention is to provide a mixing valve having hot and cold water inlets having valves therein closed by the pressure of the water acting thereon, in which the temperature of the water delivered from the valve outlet is varied by varying the degree of closing the valves.

A still further object of the invention is to provide a mixing valve having a central mixing chamber and hot and cold water inlets leading thereinto having valves associated therewith, closed by the pressure of fluid acting thereon, in which individual stop means are provided, effective during the washing and rinsing operation to preselect the temperature of the water delivered by the valve for both the washing and the rinsing operations.

These and other objects of the invention will appear from time to time as the following specification proceeds and with reference to the accompanying drawings wherein:

Figure 1 is a fragmentary horizontal sectional view taken through a mixing valve constructed in accordance with the invention; and Figure 2 is a partial fragmentary vertical sectional view taken through the valve shown in Figure 1.

In the embodiment of the invention illustrated in the drawings, the valve is shown as comprising a valve body 10 having hot and cold water inlets 11 and 12, respectively, leading into a mixing chamber 13 having a passageway 15 leading therefrom and opening to the opposite end of the valve body 10 from the inlets 11 and 12. The passageway 15 encircles an outlet port 16 having communication with an outlet fitting 17 through a uniform rate of flow control device 79, assuring a substantially uniform delivery rate of the water from the valve.

The uniform rate of flow control device 19 is shown as being a resilient annulus seated on a frusto-conical seat 20 in the outlet 17 and flexing thereinto upon increases in pressure to reduce the cross-sectional area of the flow orifice thereof and to maintain a substantially uniform rate of flow through the outlet 17 over a wide range of pressure variations. Such a uniform rate of flow control is shown and described in Patent No. 2,454,929 which issued to Leslie A. Kempton on November 30, 1948 and is no part of the present invention so need not herein be shown or described further.

The passageway 15 and the port 16, opening to the outer end of the valve are closed by a diaphragm valve 21. The diaphragm valve 21 is a well known form of pressure operated solenoid controlled valve in which an armature 22 of a solenoid 23 is slidably guided within a magnet coil 24 of the solenoid and is spring biased into engagement with a central orifice 25 leading through the diaphragm valve. The diaphragm valve 21 has a bleeder passageway 36 leading therethrough to pass water from one side of the diaphragm to the other and create a pressure differential on both sides of the diaphragm when the orifice 25 is closed by engagement with the armature 22, to maintain the valve closed by the pressure of the water acting on the outer face thereof. Upon energization of the magnet coil 24, the armature 22 will move out of engagement with the central orifice 25 relieving pressure from the outer side of the diaphragm valve 21 to effect the opening of said diaphragm valve by the pressure of fluid acting on the underside thereof in a well known manner.

The hot water inlet 11 is shown as having a well known form of generally hat-shape screen 27 pressed thereinto at the inlet end of an apertured plate 29, seated in said inlet and forming a seat for a resilient check valve 30. The check valve 30 has a resilient boss 31 extending outwardly from the face thereof and pressed within the seat 29, for retaining said valve to said plate in a manner well known to those skilled in the art, so not herein shown or described further.

The cold water inlet 12 has a similar screen 32 and check valve 33 adjacent the inlet end thereof. The check valves 30 and 33 are provided to prevent the circulation of water back to the inlet lines when the valve 21 is closed and valves 35 and 36 in the respective inlets 11 and 12 are open.

The valve 35 is shown as being in the general form of a poppet valve having a stem 37 projecting from the face thereof in a downstream direction through a seat 39 pressed within the inlet passageway 11 downstream of the check valve 30 and sealed thereto as by a seal 40. The stem 39 terminates into a follower 41 slidably guided within the inlet 11 and having an arcuate face 43 engageable with either a wash cam 44 or a rinse cam 45 limiting movement of the valve 35 toward a closed position. The arcuate face 43 is biased into engagement with the faces of either of the cams 44 or 45, by a spring 46.

It may be seen from Figure 2 that the follower 41 in addition to the arcuate face 43 has a vertically extending face 47 receding from the face 43 in opposite directions, which serves to guide either of the cams 44 or 45 to come into engagement with the arcuate face 43 during shifting movement of said cams, as will hereinafter be more clearly described as this specification proceeds.

The valve 36 like the valve 35 is biased into engagement with a seat 49 by a spring 50 and has a stem 51 extending therefrom in a downstream direction having a follower 53 like the follower 43 extending inwardly therefrom toward the valve chamber 13.

The cam 44 has a hollow boss 55 extending upwardly from the face thereof from which extends a hollow shaft 56. The hollow shaft 56 extends through a cover 57 for the mixing chamber 13 and is shown as being sealed thereto as by an O-ring 59. A knob 60 is provided on the upper end of the hollow shaft 56 to afford a means for turning said shaft and changing the position of the cam 44 with respect to the followers 41 and 53.

The cam 45 has a boss 61 extending upwardly therefrom abutting the underface of the cam 44 and having a shaft 63 extending upwardly therefrom through the interior of the hollow shaft 56. An O-ring 64 recessed within the shaft 63 is provided to seal said shaft to the hollow shaft 56. A knob 65 is provided on the upper end of the shaft 63 to afford a means for turning said shaft with respect to the hollow shaft 56 and varying the position of the cam 45 with respect to the followers 41 and 53.

The under surface of the cam 45 is abutted by a spider 66 mounted on the upper end of a cylinder 67 of a thermal element 69. The spider 66 abuts a spring seat 70 also mounted on the cylinder 67 and serves to limit movement of the cam 44 to a position to engage the faces of the followers 41 and 53 during a washing operation. A spring 71 seated under the cover 57 for the mixing chamber 13 at one end and on the upper surface of the cam 44 at its opposite end, is provided to bias the cam 45 into engagement with the spider 60 and thereby to bias the cam 44 in position to engage the faces of the followers 41 and 53.

The thermal element 69 is shown as being in the form of the heat motor heated by a resistor heater 73 for extending a power member 74 of the thermal element from the cylinder 67 to bring the cam 45 in position to engage the followers 41 and 53 and control the temperature of the water delivered through the outlet 17 of the valve during the rinsing operation in accordance with the setting of the rinse cam 45.

The thermal element 69 is shown as being of a so-called power type of thermal element wherein a fusible thermally expansible material contained within a casing 75 of the thermal element extends the power member or piston 74 from the cylinder 67 of the thermal element upon energization of the resistor heater 73. The thermal element 69 is of the same general type shown and described in Patent No. 2,368,181 which issued to Sergius Vernet on January 30, 1945 and is no part of our present invention so need not herein be shown or described further.

The cylinder 67 of the thermal element 69 extends through the bottom of the valve body 10 and is slidably guided therein in a bearing 76 extending upwardly through the bottom of the valve body 10 within the mixing chamber 13 and around an annular boss 77 spaced radially from the cylinder 67, and is sealed to said boss to prevent the leakage of water from the mixing chamber, as by an annular seal 79. An O-ring seal and retainer 81 recessed within the portion of the bearing 76 extending about the annular boss 77, are provided to seal the cylinder 67 to the valve body to prevent the leakage of water along said cylinder.

The thermal element 69 and cylinder 67 of said thermal element are maintained in position within the mixing chamber 13 as by a spring 85 seated on the spring seat 70. The spring 85 is sufficiently strong to normally act as a solid member but to yield when the boss 55 comes into engagement with the retainer for the O-ring 59 and accommodate movement of the thermal element outwardly with respect to the valve body 10 and open the contacts of a safety switch 86, connecting the resistor heater 73 in an energizing circuit.

Thus upon energization of the resistor heater 73, which may be effected through the cyclic timer of a washing machine and the like, when the timer comes into its rinsing cycle, the casing 75 of the thermal element 69 will be heated to effect the extension of the power member 74 from the cylinder 67 to bring the cam 45 into position to engage the arcuate engaging faces of the followers 41 and 53 and thus hold the valves 35 and 36 in positions determined by the position of the rinse cam 45. As the rinse cam 45 comes into the position formerly occupied by the wash cam 44, effected by extensible movement of the power member 74 of the thermal element 69, the end of the boss 55 will come into engagement with the retainer for the seal 59. This will effect retractible movement of the thermal element 69 with respect to the valve body against the spring 85 and will open the contacts of the safety switch 86 and break the energizing circuit to the resistor heater 73. As the thermal element cools, the spring 85 will again extensibly move the cylinder 67 within the mixing chamber 13 and maintain the cam 45 in its operative position as long as electric power is supplied to the safety switch 86.

At the termination of the rinsing operation, the cyclic timer will open the energizing circuit to the safety switch 86 and deenergize the resistor heater 73. The spring 71 will then disengage the rinse cam 45 from the followers 41 and 53 and return the power member 74 with respect to the cylinder 67 and also return the wash cam 44 to the position shown in Figure 2. The wash cam 44 will then again be in position to control the positions of the valves 35 and 36 and the temperature of the water delivered through the outlet 17.

It may be seen from Figure 1, that when the wash cam 44 is in the position shown, that the valve 35 will be in its full open position while the valve 36 will be closed. This will effect the delivery of hot water into the mixing chamber 13 and through the outlet 17, when the valve 21 is open. As the cam 44 is turned in a clockwise direction, the valve 35 will move toward a closed position while the valve 36 will move towards an open position, to admit more cold water into the mixing chamber, to temper the hot water.

As the wash cam 44 is turned 90° from the position shown in Figure 1, the cam 44 will engage the follower 53 at point "X" on the cam. This will fully open the valve 36. Point "Y" on the cam 44 will then come into engagement with the follower 41 accommodating the spring 46 to fully close the valve 35 and block the passage of hot water into the mixing chamber 13. In this position of the cam 44, cold water will be delivered into the mixing chamber for discharge through the outlet 17 upon opening of the diaphragm valve 21. Continued movement of the cam 44 in a clockwise direction will effect movement of the valve 36 toward a closed position to restrict the flow of cold water into the mixing chamber 13 and opening of the valve 35 to increase the flow of hot water into said mixing chamber.

It may be seen from the foregoing that with the valve of our present invention, any desired wash temperature can be selected between the temperature of the cold water entering the valve and the temperature of the hot water entering the valve. In a similar manner any desired rinse temperature can be preselected regardless of the wash temperature selected.

If desired the wash and rinse cams may be keyed together and the rinse cam may be angularly offset with respect to the wash cam to effect rinsing at a lower temperature than the selected temperature for washing, without selecting the rinsing temperature.

It will be understood that modifications and variations in the present invention may be effected without departing from the spirit and scope of the novel concepts thereof.

We claim as our invention:

1. In a mixing valve, a valve body having a mixing chamber therein, hot and cold water inlets into said valve body and mixing chamber, an outlet from said mixing chamber, valve means in said inlets movable toward closed positions by the pressure of water thereon flowing through said inlets, a first adjustable means accommodating the positions of said valve means to be changed and stopping said valve means in certain predetermined operative positions to vary the temperature of the water delivered through said outlet for one operation, a second adjustable means accommodating the positions of said valve means to be changed to vary the temperature of the water delivered through said outlet for a second operation, said first and second adjustable means each being adjustable independently of the other, and electrically energizable means for moving said first adjustable means out of operative position after said one operation and bringing said second adjustable means into position to be effective during a second operation.

2. A mixing valve comprising a valve body having a mixing chamber therein, separate hot and cold water inlets leading into said valve body and mixing chamber, an outlet from said mixing chamber and valve body, a valve retaining fluid in said mixing chamber and operable to control the delivery of water through said outlet, valve means in said inlets movable by the pressure of water acting thereon, and means accommodating the positions of said valve means toward closed positions to be changed to vary the temperature of the water delivered through said outlet comprising a first adjustable means accommodating the positions of said valves to be changed for one operation, a second adjustable means accommodating the positions of said valves to be changed for a second operation, and means bringing said second adjustable means into position to be effective during a second operation, comprising a thermal element having an extensible power member engageable with said adjustable means, and electrically energizable means heating said thermal element to effect extensible movement of said power member to bring said first adjustable means out of operative position after said one operation and to bring said second adjustable means into position to be effective during a second operation.

3. In a mixing valve, a valve body having a mixing chamber therein, separate hot and cold water inlets leading into said valve body and mixing chamber, an outlet from said mixing chamber, valve seats in said inlets, valves cooperating with said seats to vary the volume of water flowing therethrough and urged toward said seats by the pressure of water acting thereon, spaced cam means operable to change the positions of said valve means with respect to said seats to vary the temperature of water delivered through said outlet, one cam means being effective during a washing operation and normally being in position to limit movement of said valve means toward said seats, a second cam means being effective during a rinsing operation and being spaced from said first cam means, means for adjusting said cam means with respect to said valve means to vary the positions of said valve means with respect to said seats, said one and said second cam means each being adjustable independently of the other, and means operable to move said one cam means out of operative position after a washing operation and to bring said second cam means into an operative position to control the positions of said valve means and the temperature of the water delivered through said outlet during a rinsing operation.

4. In a mixing valve, a valve body having a mixing chamber therein, separate hot and cold water inlets leading into said valve body and mixing chamber, an outlet from said mixing chamber, valve seats in said inlets, valves cooperating with said seats to vary the volume of water flowing therethrough and urged toward said seats by the pressure of water acting thereon, spaced cam means operable to change the positions of said valve means with respect to said seats to vary the temperature of water delivered through said outlet, one cam means being effective during a washing operation and normally being in position to limit movement of said valve means toward said seats, a second cam means being effective during a rinsing operation and being spaced from said first cam means, means for adjusting said cam means with respect to said valve means to vary the positions of said valve means with respect to said seats, said one and said second cam means each being adjustable independently of the other, and means operable to move said one cam means out of operative position after a washing operation and to bring said second cam means into an operative position to control the positions of said valve means and the temperature of the water delivered through said outlet during a rinsing operation, comprising a heat motor having a power member operatively connected with said cam means for moving said second cam means into a position to control the temperature of the rinse water during a rinsing operation upon heating of said heat motor and extensible movement of said power member.

5. In a mixing valve, a valve body having a mixing chamber therein, separate hot and cold water inlets leading into said valve body and mixing chamber, an outlet from said mixing chamber, valve seats in said inlets, valves cooperating with said seats to vary the volume of water flowing therethrough and urged toward said seats by the pressure of water acting thereon, spaced cam means operable to change the positions of said valve means with respect to said seats to vary the temperature of water delivered through said outlet, one cam means being effective during a washing operation and normally being in position to limit movement of said valve means toward said seats, a second cam means being effective during a rinsing operation and being spaced from said first cam means, means for adjusting said cam means with respect to said valve means to vary the positions of said valve means with respect to said seats, said one and said second cam means each being adjustable independently of the other and means operable to move said one cam means out of operative position after a washing operation and to bring said second cam means into an operative position to control the positions of said valve means and the temperature of the water delivered through said outlet during a rinsing operation, comprising a thermal element mounted in said valve and having an extensible power member engageable with said cam means, and electrically energizable means for heating said thermal element.

6. In a mixing valve for washing machines, and the like, a valve body having a mixing chamber therein, hot and cold water inlets leading into said valve body and mixing chamber, an outlet from said mixing chamber and valve body, a valve controlling the delivery of water through said outlet, individual valve seats in said inlets, valves urged toward said seats by the pressure of fluid acting thereon for controlling the volume of water delivered into said mixing chamber, two spaced cams controlling the positions of valves with respect to said seats, a first being normally in position to control the positions of said valves with respect to said seats and being effective during a washing operation, a second being normally out of position to control the positions of said valves with respect to said seats, individual adjustment means for said cams, and means operable to bring said first cam means out of position to be effective to control the positions of said valves with respect to said seats and to bring the second of said cam means into position to control the positions of said valves with respect to said seats during a rinsing operation.

7. In a mixing valve for washing machines and the like, a valve body having a mixing chamber therein, hot and cold water inlets into said mixing chamber, an outlet from said mixing chamber, individual seats in said inlets, valves urged toward said seats by the pressure of water acting thereon and movable with respect to said seats to control the volume of water delivered into said mixing chamber, two spaced cams in said mixing chamber and individually operable to control the position of said valves with respect to said seats and the volume of water delivered into said mixing chamber, one being normally in position to be effective during a washing operation, a second being normally out of position to control the positions of said valves with respect to said seats and being effective during a rinsing operation, means for independently adjusting said cams and preselecting the temperature of the water to be delivered through said outlet for the washing and the rinsing operations, a thermal element having a cylinder guided in said valve body and a piston extensible therefrom to shift said first cam out of its normal position and shift said second cam into position to be effective to control the positions of said valves with respect to said seats, a spring maintaining said thermal element and cylinder in position within said chamber and accommodating retractible movement of said thermal element with respect to said chamber upon over-temperature conditions of said thermal element, and a second spring returning said power member of said thermal element upon predetermined reductions in temperature.

8. In a mixing valve for washing machines and the like, a valve body having a mixing chamber therein, hot and cold water inlets into said mixing chamber, an outlet from said mixing chamber, individual seats in said inlets, valves urged toward said seats by the pressure of water acting thereon and movable with respect to said seats to control the volume of water delivered into said mixing chamber, two spaced cams in said mixing chamber and individually operable to control the position of said valves with respect to said seats and the volume of water delivered into said mixing chamber, one being normally in position to be effective during a washing operation, a second being normally out of position to control the positions of said valves with respect to said seats and being effective during a rinsing operation, means for independently adjusting said cams and preselecting the temperature of the water to be delivered through said outlet for the washing and the rinsing operations, a thermal element having a cylinder guided in said valve body and a piston extensible therefrom to shift said first cam out of its normal position and shift said second cam into position to be effective to control the positions of said valves with respect to said seats, a spring maintaining said thermal element and cylinder in position within said chamber and accommodating retractible movement of said thermal element with respect to said chamber upon over-temperature conditions of said thermal element, a second spring returning said power member of said thermal element upon reductions in temperature of said thermal element and positioning said one cam into its normal effective position, electrically energizable means for heating said thermal element, and an energizing circuit for said electrically energizable means having a switch therein opening upon retractible movement of said cylinder with respect to said casing and coacting with said first spring to maintain said second cam in its effective position during energization of said energizing circuit.

9. In a mixing valve, a valve body having a mixing chamber therein, separate hot and cold water inlets leading into said valve body and mixing chamber, an outlet from said mixing chamber and valve body, a shut-off valve associated with said outlet to control delivery of water therethrough, proportioning valve means associated with said inlets and controlling the proportions of hot and cold water supplied through said inlets to said mixing chamber, a first adjustable means controlling said proportioning valve means for a first operation, a second adjustable means controlling said proportioning valve means for a second operation, said first and second adjustable means each being adjustable independently of the other, and means for moving said first adjustable means out of operative position after said first operation and moving said second adjustable means into operative position for said second operation.

10. A mixing valve comprising a valve body having a mixing chamber therein, separate hot and cold water inlets leading into said valve body and mixing chamber, an outlet from said mixing chamber and valve body, a valve retaining fluid in said mixing chamber and operable to control the delivery of water through said outlet, valve means in said inlets movable toward closed positions by the pressure of water acting thereon, and means accommodating the positions of said valve means to be changed to vary the temperature of the water delivered through said outlet comprising a first adjustable means accommodating the positions of said valve means to be changed for one operation, a second adjustable means spaced from said first adjustable means and accommodating the positions of said valve means to be changed for a second operation, and remotely and automatically operable means for moving said first adjustable means out of operative position after said one operation and bringing said second adjustable means into position to be effective during a second operation to vary the temperature of the water delivered through said outlet from that selected for said one operation to the selected temperature for said second operation.

References Cited in the file of this patent

UNITED STATES PATENTS

| | | |
|---|---|---|
| 1,225,887 | Swan | May 15, 1917 |
| 2,614,851 | Parker | Oct. 21, 1952 |
| 2,679,865 | Griffith | June 1, 1954 |